United States Patent
Wang et al.

(10) Patent No.: US 10,604,662 B2
(45) Date of Patent: Mar. 31, 2020

(54) FILM-FORMING SILICA SOL, METHOD OF PREPARING THE SAME, AND APPLICATION OF THE SAME

(71) Applicants: Shanghai Xinanna Electronic Technology Co., LTD, Shanghai (CN); Shanghai Institute of Microsystem and Information Technology, Chinese Academy of Sciences, Shanghai (CN)

(72) Inventors: Yongxia Wang, Shanghai (CN); Weili Liu, Shanghai (CN); Zhitang Song, Shanghai (CN)

(73) Assignees: Shanghai Xinanna Electronic Technology Co., Ltd., Shanghai (CN); Shanghai Institute of Microsystem and Information Technology, Chinese Academy of Sciences, Shanghai (CN)

(*) Notice: Subject to any disclaimer, the term of this patent is extended or adjusted under 35 U.S.C. 154(b) by 75 days.

(21) Appl. No.: 15/219,522

(22) Filed: Jul. 26, 2016

(65) Prior Publication Data
US 2017/0233589 A1    Aug. 17, 2017

(51) Int. Cl.
| | | |
|---|---|---|
| *C09D 175/04* | (2006.01) | |
| *C09D 7/61* | (2018.01) | |
| *C09D 1/00* | (2006.01) | |
| *B05D 7/14* | (2006.01) | |
| *C09D 125/14* | (2006.01) | |
| *C08K 3/36* | (2006.01) | |

(52) U.S. Cl.
CPC .......... *C09D 7/61* (2018.01); *B05D 7/14* (2013.01); *C09D 1/00* (2013.01); *C09D 125/14* (2013.01); *C09D 175/04* (2013.01); *C08K 3/36* (2013.01)

(58) Field of Classification Search
CPC ....... C09D 125/14; C09D 175/04; C08K 3/36
See application file for complete search history.

(56) References Cited

U.S. PATENT DOCUMENTS

| | | | | |
|---|---|---|---|---|
| 4,659,394 A | * | 4/1987 | Hara | C09D 5/08 148/251 |
| 6,376,559 B1 | * | 4/2002 | Komoto | C08G 18/6254 106/287.34 |
| 6,472,467 B1 | * | 10/2002 | Chiao | C09D 5/00 524/755 |
| 2012/0059089 A1 | * | 3/2012 | Greenwood | B82Y 30/00 523/455 |
| 2016/0312367 A1 | * | 10/2016 | Jang | C23C 28/00 |

FOREIGN PATENT DOCUMENTS

| | | |
|---|---|---|
| CN | 103937353 A | 7/2014 |
| CN | 104559336 A | 4/2015 |
| CN | 104789054 A | 7/2015 |

OTHER PUBLICATIONS

English language abstract CN 104059398, Apr. 2014.*
English language abstract CN 102731735, Oct. 2012.*
First Search (including English translation) issued in corresponding Chinese Patent Application No. 201610089066.1, dated May 8, 2017, 1 page.
First Office Action (including English translation) issued in corresponding Chinese Patent Application No. 201610089066.1, dated May 24, 2017, 12 pages.

* cited by examiner

*Primary Examiner* — Margaret G Moore
(74) *Attorney, Agent, or Firm* — Arch & Lake LLP

(57) ABSTRACT

The present disclosure relates to the field of preparing an inorganic nanometer material and application thereof, and specifically relates to a film-forming silica sol, a method of preparing the silica sol, and usage thereof. The present disclosure provides a film-forming silica sol comprising, by weight percentage, constituents of: silica sol: 66-91%; modifying agent: 0.1-1.8%; film-forming auxiliary: 7.2-33.9%. The present disclosure further provides a method of preparing a film-forming silica sol and an application thereof. With the film-forming silica sol, a method of preparing the silica sol, and usage thereof according to the present disclosure, the prepared film-forming silica sol has a good appearance transparency and stability, and when applied to paint as a film-forming coating, it has a good glossiness, a high hardness, and a strong adhesive force; therefore, it has a high practical value in the paint field.

7 Claims, 2 Drawing Sheets

FILM-FORMING SILICA SOL, METHOD OF PREPARING THE SAME, AND APPLICATION OF THE SAME

CROSS REFERENCE TO RELATED APPLICATION

The present application claims the benefit of Chinese Patent Application No. 201610089066.1, filed on Feb. 17, 2016, the entire disclosure of which is incorporated herein by reference.

FIELD OF THE DISCLOSURE

The present disclosure relates to the field of preparing and applying an inorganic nanometer material, and more specifically relates to a film-forming silica sol, a method of preparing the silica sol, and application thereof.

BACKGROUND OF THE DISCLOSURE

Silica sol is a colloidal solution of a nanometer-order inorganic poly-metasilicic acid with water as a dispersion medium; during use, it may be used in film forming as an independent film-forming substance, but problems like cracks of a certain extent will occur after the film forming, which affects continuity of the film layer. In order to improve the film-forming performance of silica sol, film-forming auxiliary is usually directly added into the silica sol so as to facilitate its film-forming.

However, when the film-forming auxiliary is directly added into the silica sol, a series of problems will occur, wherein one important problem thereof is the stability of the film-forming auxiliary and the silica sol. The silica sol is a thermodynamic instable system that relies on electrical charge or some other stabilizers to facilitate dispersion; during a compound procedure, it likely causes flocculation, agglomeration or gol due to change of the environment conditions; therefore, the film-forming additive should have a good compatibility with the silica sol. Thus selecting an appropriate film-forming auxiliary is particularly important. Besides, addition of other additives in the system including the film-forming auxiliary and silica sol will facilitate the stability of the film-forming auxiliary and silica sol system; meanwhile, it will also facilitate the continuity of the film forming after the film-forming silica sol is dried. In view of the above, it is significant to develop a film-forming silica sol with a good stability so as to apply it in wider areas.

SUMMARY OF THE DISCLOSURE

In view of all of the above drawbacks in the prior art, an objective of the present disclosure is to provide a film-forming silica sol, a method of preparing the silica sol, and an application thereof, so as to obtain a film-forming silica sol through a method with a simple process and a strong controllability. By applying the film-forming silica sol on a matrix, the final dried coating has a higher hardness, a stronger adhesive force, and a tunable transparency.

In order to achieve the above objective and other relevant objectives, in a first aspect of the present disclosure, there is provided a film-forming silica sol, comprising, by weight percentage, constituents of:
 silica sol: 66-91%;
 modifying agent: 0.1-1.8%; and
 film-forming auxiliary: 7.2-33.9%.

Preferably, the silica sol is a colloidal water solution containing silicon oxide particles.

More preferably, the silica sol has a solid content (i.e., silicon oxide particle content) of 6-40 wt %.

Further preferably, the silica sol has a solid content (i.e., silicon oxide particle content) of 30 wt %.

Preferably, the silica sol (i.e., silicon oxide particles) has a particle size of 6-15 nm. More preferably, the silica sol (i.e., silicon oxide particles) has a particle size of 10 nm.

Preferably, the modifying agent is selected from one of a silane coupling agent and a surface active agent.

More preferably, the silane coupling agent includes a siloxane compound containing an epoxy group.

Further preferably, the siloxane compound containing an epoxy group comprises γ-(2,3-epoxypropoxy) propyltrimethoxysilane or vinyltriethoxysilane. The CAS number of the γ-(2,3-epoxypropoxy) propyltrimethoxysilane is 2530-83-8. The CAS number of the vinyltriethoxysilane is 78-08-0.

More preferably, the surface active agent includes a low molecular weight polyvinyl alcohol. The CAS number of the polyvinyl alcohol is 9002-89-5.

Further preferably, the low molecular weight polyvinyl alcohol has a average molecular weight of 40-1000.

Preferably, the film-forming auxiliary is selected from one of acrylic resin, polyurethane, styrene-acrylic resin, and epoxy resin.

In a second aspect of the present disclosure, there is provided a method of preparing a film-forming silica sol, comprising the steps of:
 1) dropping a modifying agent into a silica sol according to a proportion, stirring and mixing them, and continuing stirring, to obtain a mixed solution;
 2) then dropping the film-forming auxiliary into the mixed solution, stirring and mixing them, continuing stirring, thereby obtaining a film-forming silica sol.

Preferably, in step 1), a dropping rate of the modifying agent is 6-8 ml/min. More preferably, the dropping rate of the silane coupling agent is 7 ml/min.

Preferably, in step 1), a duration of the stirring and mixing is 0.5-2 hours. More preferably, the duration of the stirring and mixing is 1 hour.

Preferably, in step 1), a duration of the continuing stirring is 1-72 hours. More preferably, the duration of the continuing stirring is 48 hours.

Preferably, in step 2), a dropping rate of the film-forming auxiliary is 8-12 ml/min. More preferably, the dropping rate of the film-forming auxiliary is 10 ml/min.

Preferably, in step 2), a duration of the stirring and mixing is 0.5-2 hours. More preferably, the duration of the stirring and mixing is 1 hour.

Preferably, in step 2), a duration of the continuing stirring is 1-5 hours. More preferably, the duration of the continuing stirring is 2 hours.

Preferably, in step 1) or 2), the preparation method is performed under a room temperature. The room temperature is 20-25° C.

Preferably, in step 1) or 2), the stirring and mixing process is a constant stirring and mixing.

Preferably, in step 1), the silica sol is a colloidal water solution containing silicon oxide particles.

More preferably, the silica sol has a solid content (i.e., silicon oxide particle content) of 6-40 wt %. More preferably, the silica sol has a solid content (i.e., silicon oxide particle content) of 30 wt %.

Preferably, the silica sol (i.e., silicon oxide particles) has a particle size of 6-15 nm. More preferably, the silica sol (i.e., silicon oxide particles) has a particle size of 10 nm.

Preferably, in step 1), the modifying agent is selected from one of a silane coupling agent and a surface active agent.

More preferably, the silane coupling agent is a siloxane compound containing an epoxy group.

Further preferably, the siloxane compound containing an epoxy group includes γ-(2,3-epoxypropoxy) propyltrimethoxysilane or vinyltriethoxysilane.

More preferably, the surface active agent includes a low molecular weight polyvinyl alcohol. Further preferably, the low molecular weight polyvinyl alcohol has a average molecular weight of 40-1000.

Preferably, in step 2), the film-forming auxiliary is selected from one of acrylic resin, polyurethane, styrene-acrylic resin, and epoxy resin.

Preferably, weight percentages of the added silica sol, modifying agent, and film-forming auxiliary, counted by a total weight as 100%, are 66-91%, 0.1-1.8%, and 7.2-33.9%, respectively.

In a third aspect of the present disclosure, there is provided usage of a film-forming silica sol as a paint.

Preferably, the usage is using the film-forming silica sol as a paint to be applied on a matrix surface into a film-forming coating.

More preferably, the matrix is selected from one of metal, wood, and ceramic, or a plurality of combinations thereof.

In a fourth aspect of the present disclosure, there is provided a method of using a film-forming silica sol, comprising applying a prepared film-forming silica sol onto a matrix by a coating machine; drying the film-forming silica sol, thereby obtaining a desired film-forming coating on a matrix surface.

Preferably, the coating machine is a conventional coating machine.

Preferably, the matrix is selected from one of metal, wood, and ceramic, or a plurality of combinations thereof.

Preferably, the film-forming coating has a film-forming thickness of 12-200 μm. The film-forming thickness may be controlled by a coating machine.

Preferably, a temperature of the drying is 25-100° C. A duration of the drying is 12-48 h.

As mentioned above, a film-forming sol gel and its preparing method and usages are provided in the present disclosure. The film-forming silica sol is prepared by a preparation method under optimized conditions. This film-forming silica sol has a good appearance transparency and stability; when applied into paint, the film-forming coating after the coated film is dried has a good glossiness, a high hardness, and a strong adhesive force. The film-forming silica sol of the present disclosure has advantages like simple processing, strong controllability, etc.; therefore, it has a high practical value in the coating field.

BRIEF DESCRIPTION OF THE ACCOMPANYING DRAWINGS

DETAILED DESCRIPTION OF THE PREFERRED EMBODIMENTS

Figure 1:
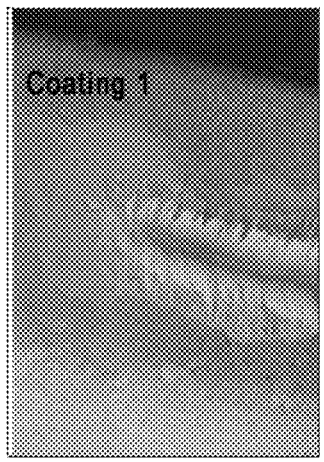
FIG. 1 illustrates a schematic diagram of Coating 1 in the present disclosure.

Hereinafter, the present disclosure will be further illustrated in conjunction with specific examples. It should be understood that these examples are only used for illustrating, not limiting, the protection scope of the present disclosure.

Hereinafter, the embodiments of the present disclosure will be illustrated through specific instances. Those skilled in the art may easily understand other advantages and effects of the present disclosure through the disclosure of the specification. The present disclosure may be implemented or applied through other different preferred embodiments. Various details in the present description may also be modified or changed based on different views or applications without departing from the spirit of the present disclosure.

It should be noted that in the following examples, processing devices or means not explicitly labeled all adopt conventional devices or means in the art; all pressure values and ranges refer to relative pressures.

The following examples use silica sol (MCS-S10, Shanghai Xinanna Electronic Technology Co., Ltd), γ-(2,3-epoxypropoxy) propyltrimethoxysilane (KH-560, Hangzhou Jessica Chemical Co., Ltd), vinyltriethoxysilane (KH-188, Hangzhou Jessica Chemical Co., Ltd), polyving akohol (1788, Sinopec Shanghai (Jinshan) Petrochemical Company Limited), acrylic resin (SYNTRAN 404, Yintai Polymer Trade (Shanghai) Co., Ltd), Polyurethane (PU037, Shanghai Yuchi Import & Export Co., Ltd), styrene-acrylic resin (SYNTRAN 1671, Yintai Polymer Trade (Shanghai) Co., Ltd), epoxy resin (CARAPOL WEP 2308, Yintai Polymer Trade (Shanghai) Co., Ltd).

Besides, it should be understood that one or more method steps in the present disclosure do not exclude existence of other method steps before and after the combining step, or other method steps may also be inserted between these explicitly mentioned steps, unless otherwise explained; it should also be understood that the combination and connection relationships between one or more devices/means mentioned in the present disclosure do not exclude existence of other devices/means before and after the combined device/means or other device/means may be inserted between two devices/means explicitly mentioned here, unless otherwise indicated. Moreover, unless otherwise indicated, serial numbers of respective method steps are only for facilitating discrimination between respective method steps, not arrangement order for limiting respective method steps or limiting the implementable scope of the present disclosure; change or adjustment of their relative relationships should also be regarded as implementable scope of the present disclosure without substantively changing the technical content.

EXAMPLE 1

Add 1 kg silica sol (solid content is 30%; its particle size is 10 nm) into a three-mouth flask and stir it; under a room temperature and a constant stirring condition, take 15.3 g γ-(2,3-epoxypropoxy) propyltrimethoxysilane and drop it into the silica sol to stir and mix, the dropping rate being 7 ml/min, the duration of stirring and mixing being 1 h; continue stirring to react for 48 h, obtaining a mixed solution. Under a constant stirring condition, drop 100 g polyurethane into the mixed solution to stir and mix, the dropping rate being 10 ml/min, the duration of stirring and mixing is 1 h; continue stirring to react for 2 h, finally preparing a film-forming silica sol sample 1#. In the film-forming silica sol sample 1#, the silica sol occupies 89.6%, the γ-(2,3-epoxypropoxy) propyltrimethoxysilane occupies 1.4%, and the polyurethane occupies 9%.

EXAMPLE 2

Add 1 kg silica sol (its solid content is 30%,; its particle size is 10 nm) into a three-mouth flask and stir it; under a room temperature and a constant stirring condition, take 15.3 g γ-(2,3-epoxypropoxy) propyltrimethoxysilane and drop it into the silica sol to stir and mix, the dropping rate being 7 ml/min, the duration of stirring and mixing being 1 h; continue stirring to react for 48 h, obtaining a mixed solution. Under a constant stirring condition, drop 150 g polyurethane into the mixed solution to stir and mix, the dropping rate being 10 ml/min, the duration of stirring and mixing is 1 h; continue stirring to react for 2 h, finally preparing a film-forming silica sol sample 2#. In the film-forming silica sol sample 2#, the silica sol occupies 85.8%, the γ-(2,3-epoxypropoxy) propyltrimethoxysilane occupies 1.3%, and the polyurethane occupies 12.9%.

EXAMPLE 3

Add 1 kg silica sol (its solid content is 30%; its particle size is 10 nm) into a three-mouth flask and stir it; under a room temperature and a constant stirring condition, take 15.3 g γ-(2,3-epoxypropoxy) propyltrimethoxysilane and drop it into the silica sol to stir and mix, the dropping rate being 7 ml/min, the duration of stirring and mixing being 1 h; continue stirring to react for 48 h, obtaining a mixed solution. Under a constant stirring condition, drop 300 g polyurethane into the mixed solution to stir and mix, the dropping rate being 10 ml/min, the duration of stirring and mixing is 1 h; continue stirring to react for 2 h, finally preparing a film-forming silica sol sample 3#. In the film-forming silica sol sample 3#, the silica sol occupies 76%, the γ-(2,3-epoxypropoxy) propyltrimethoxysilane occupies 1.2%, and the polyurethane occupies 22.8%.

EXAMPLE 4

Add 1 kg silica sol (its solid content is 30%; its particle size is 10 nm) into a three-mouth flask and stir it; under a room temperature and a constant stirring condition, take 15.3 g γ-(2,3-epoxypropoxy) propyltrimethoxysilane and drop it into the silica sol to stir and mix, the dropping rate being 7 ml/min, the duration of stirring and mixing being 1 h; continue stirring to react for 48 h, obtaining a mixed solution. Under a constant stirring condition, drop 500 g polyurethane into the mixed solution to stir and mix, the dropping rate being 10 ml/min, the duration of stirring and mixing is 1 h; continue stirring to react for 2 h, finally preparing a film-forming silica sol sample 4#. In the film-forming silica sol sample 4#, the silica sol occupies 66%, the γ-(2,3-epoxypropoxy) propyltrimethoxysilane occupies 1%, and the polyurethane occupies 33%.

EXAMPLE 5

Add 1 kg silica sol (its solid content is 6%; its particle size is 15 nm) into a three-mouth flask and stir it; under a room temperature and a constant stirring condition, take 15.3 g vinyltriethoxysilane and drop it into the silica sol to stir and mix, the dropping rate being 6 ml/min, the duration of stirring and mixing being 0.5 h; continue stirring to react for 1 h, obtaining a mixed solution. Under a constant stirring condition, drop 500 g acrylic resin into the mixed solution to stir and mix, the dropping rate being 8 ml/min, the duration of stirring and mixing is 0.5 h; continue stirring to react for 1 h, finally preparing a film-forming silica sol sample 5#. In the film-forming silica sol sample 5#, the silica sol occupies 66%, the vinyltriethoxysilane occupies 1%, and the acrylic resin occupies 33%.

EXAMPLE 6

Add 1 kg silica sol (its solid content is 40%; its particle size is 6 nm) into a three-mouth flask and stir it; under a room temperature and a constant stirring condition, take 15.3 g low molecular weight polyvinyl alcohol and drop it into the silica sol to stir and mix, the dropping rate being 8 ml/min, the duration of stirring and mixing being 2 h; continue stirring to react for 72 h, obtaining a mixed solution. Under a constant stirring condition, drop 500 g styrene-acrylic resin into the mixed solution to stir and mix, the dropping rate being 12 ml/min, the duration of stirring and mixing is 2 h; continue stirring to react for 5 h, finally preparing a film-forming silica sol sample 6#. In the film-forming silica sol sample 6#, the silica sol occupies 66%, the low molecular weight polyvinyl alcohol occupies 1%, and the styrene-acrylic resin occupies 33%.

APPLICATION EXAMPLE 1

Apply pure silica sol without being processed by a modifying agent and a film-forming auxiliary onto an aluminum plate surface; after the membrane layer is naturally dried, Coating 1 is formed. The specific result was shown in FIG. 1.

APPLICATION EXAMPLE 2

Figure 2:
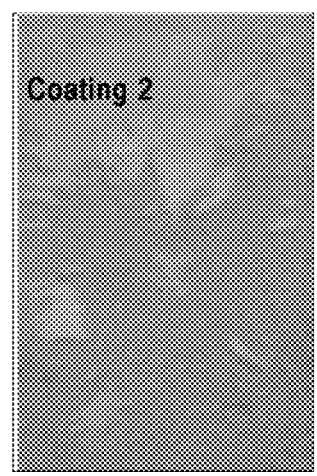
FIG. 2 illustrates a schematic diagram of Coating 2 in the present disclosure.

Apply the film-forming silica sol sample 1# onto an aluminum plate surface by a coating machine; after the membrane layer is naturally dried, Coating 2 is formed. The specific result was shown in FIG. 2.

APPLICATION EXAMPLE 3

Figure 3:
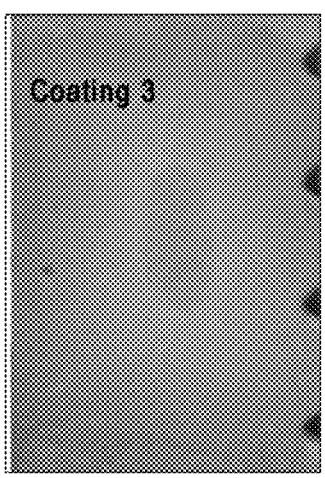
FIG. 3 illustrates a schematic diagram of Coating 3 in the present disclosure.

Apply the film-forming silica sol sample 2# onto an aluminum plate surface by a coating machine; after the membrane layer is naturally dried, Coating 3 is formed. The specific result was shown in FIG. 3.

APPLICATION EXAMPLE 4

Figure 4:
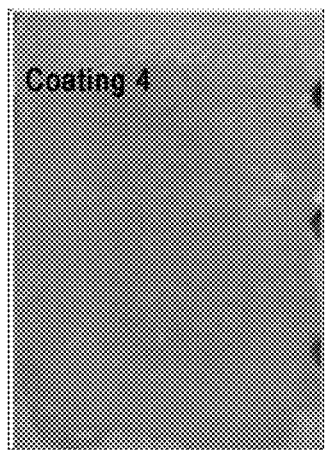
FIG. 4 illustrates a schematic diagram of Coating 4 in the present disclosure.

Apply the film-forming silica sol sample 3# onto an aluminum plate surface by a coating machine; after the membrane layer is naturally dried, Coating 4 is formed. The specific result was shown in FIG. 4.

APPLICATION EXAMPLE 5

Figure 5:
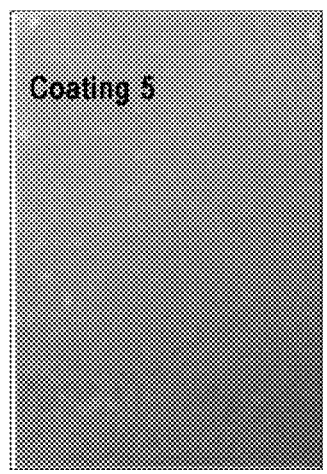
FIG. 5 illustrates a schematic diagram of Coating 5 in the present disclosure.

Apply the film-forming silica sol sample 4# onto an aluminum plate surface by a coating machine; after the membrane layer is naturally dried, Coating 5 is formed. The specific result was shown in FIG. 5.

TEST EXAMPLE 1

Test the hardness of Coatings 1-5 after natural drying in Application Examples 1-5. The test results are illustrated in Table 1.

TABLE 1

| | Sample | | | | |
|---|---|---|---|---|---|
| | Coating 1 | Coating 2 | Coating 3 | Coating 4 | Coating 5 |
| Silica sol (g) | 1000 | 1000 | 1000 | 1000 | 1000 |
| Modifying agent (g) | — | 15.3 | 15.3 | 15.3 | 15.3 |
| Amount of adding the film-forming auxiliary (g) | — | 100 | 150 | 300 | 500 |
| Moh's hardness | — | 1 | 2 | 3 | 2 |

As shown in Table 1 that compared with coating 1 without adding the modifying agent and film-forming auxiliary, coatings 2-5 added with the modifying agent and film-forming auxiliary had a higher hardness; however, the more film-forming auxiliary amount was added, the lower the dried membrane layer hardness is was; therefore, compared with Coating 5, Coating 4 had a better hardness.

Meanwhile, as shown in FIGS. 1-5 that by obtaining the glossiness and adhesive force related information through naked-eye observation and key scratching, compared with Coating 1 without adding the modifying agent and the film-forming auxiliary, the glossiness of the coating increased with the amount of film-forming auxiliary being added, and the transparency of the membrane layer gradually increased, i.e., the more the film-forming auxiliary was added, the better the glossiness was; therefore, Coating 5 has a good glossiness. Meanwhile, the stronger the binding force among the coating and the membrane layer and the matrix was, the better its adhesive performance was; while the stronger binding force among the coating layer 5 and the membrane layer and the matrix indicates a good adhesive performance.

In view of the above results, after the modifying agent and the film-forming auxiliary are added, only when an appropriate film-forming auxiliary amount is added, can the hardness, glossiness, and adhesive force of the coating reach an optimum value.

Therefore, the present disclosure effectively overcomes various drawbacks in the prior art and thus has a high industrial utilization value.

The embodiments above only exemplarily illustrate the principle and effect of the present disclosure, not for limiting the present disclosure. Any person familiar with this technology may modify or change the examples above without departing from the spirit and scope of the present disclosure. Therefore, any modification or change implemented by any person skilled in the art without departing from the spirit and technical idea of the present disclosure should be included within the claims of the present disclosure.

What is claimed is:

1. A film-forming silica sol composition comprising:
   1 kg of silica sol, wherein the silica sol is a colloidal water solution containing silicon oxide particles of a same size and wherein the silica sol has a solid content of 30 wt %,
   15.3 g of a modifying agent, wherein the modifying agent comprises γ-(2,3-epoxypropoxy) propyltrimethoxysilane, and
   500 g of a film-forming auxiliary, wherein the film forming auxiliary comprises polyurethane.

2. A method of preparing a film-forming silica sol composition according to claim 1, comprising the steps of:
   1) dropping the modifying agent into the silica sol composition according to a proportion, stirring and mixing them, and continuing stirring, to obtain a mixed solution; and
   2) dropping the film-forming auxiliary into the mixed solution, stirring and mixing them, and continuing stirring, thereby obtaining the film-forming silica sol composition.

3. The method of preparing a film-forming silica sol composition according to claim 2, wherein in step 1), comprising one or more of the conditions of:
   A1) a dropping rate of the modifying agent is 6-8 ml/min;
   A2) a duration of the stirring and mixing is 0.5-2 hours; and
   A3) a duration of the continuing stirring is 1-72 hours.

4. The method of preparing a film-forming silica sol composition according to claim 2, wherein in step 2), comprising one or more of the conditions of:
   B1) a dropping rate of the film-forming auxiliary is 8-12 ml/min;
   B2) a duration of the stirring and mixing is 0.5-2 hours; and
   B3) a duration of the continuing stirring is 1-5 hours.

5. A paint formed form the film forming silica sol composition of claim 1.

6. The paint of claim 5, wherein the paint is applied on a matrix surface.

7. A method of preparing the paint of claim 5 comprising applying the film forming silica sol composition onto a matrix by a coating machine and drying the film forming silica sol composition, thereby forming a film forming paint on a matrix surface.

* * * * *